US009465221B2

(12) United States Patent
Webster et al.

(10) Patent No.: US 9,465,221 B2
(45) Date of Patent: Oct. 11, 2016

(54) DIGITAL CAMERA WITH LIGHT SPLITTER

(71) Applicant: Apple Inc., Cupertino, CA (US)

(72) Inventors: Steven Webster, Palo Alto, CA (US); Ning Y. Chan, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/639,870

(22) Filed: Mar. 5, 2015

(65) Prior Publication Data

US 2015/0177524 A1 Jun. 25, 2015

Related U.S. Application Data

(63) Continuation of application No. 13/229,363, filed on Sep. 9, 2011, now Pat. No. 8,988,564.

(51) Int. Cl.
G02B 27/10 (2006.01)
G02B 27/14 (2006.01)
H04N 5/225 (2006.01)
H04N 5/232 (2006.01)
(Continued)

(52) U.S. Cl.
CPC ......... G02B 27/1013 (2013.01); G02B 27/149 (2013.01); G03B 33/12 (2013.01); H04N 5/2253 (2013.01); H04N 5/2254 (2013.01); G02B 13/009 (2013.01); G02B 15/177 (2013.01); G02B 27/646 (2013.01); G03B 17/17 (2013.01); H04N 5/23212 (2013.01); H04N 5/23248 (2013.01); H04N 5/23296 (2013.01); H04N 2209/049 (2013.01)

(58) Field of Classification Search
CPC ....................................................... H04N 9/04

USPC .......... 348/265, 336, 337, 345, 350; 358/50, 358/55; 359/634
See application file for complete search history.

(56) References Cited

U.S. PATENT DOCUMENTS 3,527,523 A 9/1970 Travis
3,976,363 A 8/1976 Toyama et al.
(Continued)

FOREIGN PATENT DOCUMENTS

EP 0359461 A2 3/1990
EP 1339238 A2 * 2/2003 ............... H04N 9/04
(Continued)

OTHER PUBLICATIONS

Korean Notice of Preliminary Rejection (dated Jul. 9, 2015), Application No. 10-2014-7008694, Date Filed Sep. 6, 2012, (5 pages).
(Continued)

Primary Examiner — Twyler Haskins
Assistant Examiner — Akshay Trehan
(74) Attorney, Agent, or Firm — Blakely, Sokoloff, Taylor & Zafman LLP

(57) ABSTRACT

A digital camera component is described that has a light splitter cube having an entrance face to receive incident light from a camera scene. The cube splits the incident light into first, second, and third color components that emerge from the cube through a first face, a second face, and a third face of the cube, respectively. First, second, and third image sensors are provided, each being positioned to receive a respective one of the color components that emerge from the first, second, and third faces of the cube. Other embodiments are also described and claimed.

19 Claims, 7 Drawing Sheets

(51) Int. Cl.
*G03B 33/12* (2006.01)
*G02B 15/177* (2006.01)
*G03B 17/17* (2006.01)
*G02B 13/00* (2006.01)
*G02B 27/64* (2006.01)

(56) References Cited

U.S. PATENT DOCUMENTS

| | | | | |
|---|---|---|---|---|
| 4,507,679 | A * | 3/1985 | Bendell | H04N 9/097 348/238 |
| 5,086,338 | A | 2/1992 | Usui | |
| 5,485,204 | A | 1/1996 | Taniji | |
| 5,597,222 | A | 1/1997 | Doany et al. | |
| 5,644,432 | A * | 7/1997 | Doany | H04N 9/3105 348/E9.027 |
| 5,868,485 | A * | 2/1999 | Fujimori | G02B 7/00 348/E5.141 |
| 6,057,894 | A * | 5/2000 | Kobayashi | H04N 9/3144 348/E9.027 |
| 6,097,544 | A * | 8/2000 | Edlinger | G02B 5/04 359/629 |
| 6,101,041 | A | 8/2000 | Ishibashi et al. | |
| 6,141,150 | A * | 10/2000 | Ushiyama | G02B 5/04 353/31 |
| 6,327,092 | B1 * | 12/2001 | Okuyama | G02B 5/04 348/E9.027 |
| 6,359,721 | B1 * | 3/2002 | Fujimori | G02F 1/133385 349/8 |
| 6,407,868 | B1 | 6/2002 | Ishibashi et al. | |
| 6,614,478 | B1 | 9/2003 | Mead | |
| 2004/0085487 | A1 * | 5/2004 | Chen | G02B 5/3083 349/5 |
| 2005/0057659 | A1 | 3/2005 | Hasegawa | |
| 2006/0055016 | A1 * | 3/2006 | Tiao | H01L 27/14618 257/680 |
| 2006/0177208 | A1 * | 8/2006 | Ito | G03B 17/17 396/55 |
| 2006/0215129 | A1 * | 9/2006 | Alasaarela | G02B 27/102 353/94 |
| 2008/0117324 | A1 | 5/2008 | Minamio et al. | |
| 2008/0129831 | A1 | 6/2008 | Cho et al. | |
| 2009/0323192 | A1 * | 12/2009 | Towndrow | G02B 27/145 359/634 |
| 2010/0091168 | A1 | 4/2010 | Igarashi et al. | |
| 2011/0181955 | A1 * | 7/2011 | Cho | G02B 27/646 359/555 |
| 2012/0249815 | A1 * | 10/2012 | Bohn | H04N 5/2254 348/208.99 |

FOREIGN PATENT DOCUMENTS

| | | |
|---|---|---|
| EP | 1339238 A2 | 8/2003 |
| EP | 1395062 A1 | 3/2004 |
| EP | 1569463 A2 | 8/2005 |
| JP | H02244993 | 9/1990 |
| JP | H06053460 | 2/1994 |
| JP | H06209094 | 7/1994 |
| JP | H07106538 | 4/1995 |
| JP | H09187024 | 7/1997 |
| JP | 2003043354 A | 2/2003 |
| JP | 2004355010 A | 12/2004 |
| JP | 2006217467 A | 8/2006 |
| JP | 2008139893 A | 6/2008 |
| JP | 2008210904 | 9/2008 |
| JP | 2008224908 A | 9/2008 |
| JP | 2011243501 A | 12/2011 |
| WO | WO-9749003 | 12/1997 |

OTHER PUBLICATIONS

Japanese Official Action (dated Apr. 3, 2015), Application No. 2014-529855, Date Filed—Sep. 6, 2012, (12 pages).
Canon, GL2 Standard Definition Camcorders, Professional Imaging Products information pages, Apr. 11, 2011, Canon Newsroom at: http://www.usa.canon.com/cusa/support/professional/professional_camcorders/standard_definition_camcorders/gl2, (2 pages).
PCT International Search Report and Written Opinion (dated Dec. 19, 2012), International Application No. PCT/US2012/053973, International Filing Date—Sep. 6, 2012, (11 pages).
Canon, GL2 Standard Definition Camcorders, Professional Imaging Products information pages, Release date Jul. 15, 2002, Canon Newsroom, (2 pages).
Non-Final Office Action (dated Nov. 12, 2013), U.S. Appl. No. 13/229,363, filed Sep. 9, 2011, First Named Inventor: Steven Webster, (25 pages).
PCT International Preliminary Report on Patentability for PCT/US2012/053973 mailed Mar. 20, 2014, (9 pages).
Final Office Action (dated May 13, 2014), U.S. Appl. No. 13/229,363, filed Sep. 9, 2011, First Named Inventor: Steven Webster, (29 pages).
AU Patent Examination Report No. 1 (dated Dec. 3, 2014), Application No. 2012304594, Date Filed: Sep. 6, 2012, (3 pages).
"Cross Dichroic Prism (X-cube)", Product Information Sheet, (1 page).
"Cross Dichroic Prism (X-cube)", Nitto Optical, Product Information Sheet—Admitted Prior Art, (3 pages).
"Digital Camcorder—3 CCD with Pixel Shift Technology", Product Information Sheet and Review, Item Code: 7920A001, (1 page).
"X-Cube Prism—P/N 9814", Product Information, Oct. 10, 2000, Rev. 1, optec, Optical & Opto-Electronic Systems, (2 pages).
Andreou, Andreas G., et al., "Polarization Imaging: Principles and Integrated Polarimeters", IEEE Sensors Journal, vol. 2, No. 6, Dec. 2002, (pp. 566-576).
Rowe, M. P., et al., "Polarization-Difference Imaging: A biologically Inspired Technique for Observation Through Scattering Media", Optics Letters, vol. 20, Issue 6, Mar. 15, 1995, doi: 10.1364/OL.20.000608, (pp. 608-610).
EP Examination Report (dated May 26, 2015), Application No. 12 758 729.3, Date Filed—Sep. 6, 2012, (6 pages).
Chinese Office Action (Dated May 9, 2016), Application No. 201280043486.6, Filing date: Sep. 6, 2012, First Named Inventor: Steven Webster, 21.
Japanese Pre-Appeal Report (Dated: Jun. 6, 2016), Application No. 2014-529855, Date Filed: Sep. 6, 2012, 24.

* cited by examiner

DIGITAL CAMERA WITH LIGHT SPLITTER

RELATED MATTERS

This application is a continuation of U.S. patent application Ser. No. 13/229,363, filed Sep. 9, 2011, entitled "Digital Camera with Light Splitter" (which will issue as U.S. Pat. No. 8,988,564 on Mar. 24, 2015).

An embodiment of the invention relates to a digital camera component having a light splitter cube that splits incident light from a camera scene into three color components, and three image sensors each being positioned to receive a respective one of the color components. Other embodiments are also described and claimed.

BACKGROUND

Personal consumer electronic devices that have a small profile such as smart phones and tablet computers have a very limited z-height or thickness (distance in the direction of the z-axis), in which to fit an integrated digital camera module. This is in contrast to the relatively deep housing of a dedicated handheld camcorder or high-end digital SLR camera. The small profile, however, presents a problem in view of the continuing trend to deliver digital pictures that have increasing resolution using larger color pixel sensor arrays. Despite improvements in pixel density, the overall area of the pixel array increases substantially for higher resolution sensors, e.g. 5 megapixels and greater. This may not be a large issue if the pixel array can be oriented within the device housing to lie within the x-y plane, i.e. perpendicular to the z-axis. However, in that configuration the limited z-height of the device housing places a constraint on the length of the optical subsystem, e.g. an autofocus lens, a zoom lens, which in turn limits camera performance.

SUMMARY

An embodiment of the invention is a digital camera component that has a light splitter cube having an entrance face to receive incident light from a camera scene. The cube splits the incident light into three color components that emerge from the cube through respective faces of the cube. Three image sensors are also provided, where each sensor is positioned to receive a respective one of the color components that emerge from the respective face of the cube. The image sensors may be clear pixel array sensors that have no color filter array or color separation capabilities, making them relatively inexpensive yet more accurate (due to no color interpolation or demosaicing required). In such a color splitting architecture, the amount of light incident on each pixel is about three times greater than in a conventional Bayer-pattern color filter array (CFA) sensor. Also, the color splitting cube may essentially avoid the color-crosstalk that is typical of traditional Bayer-pattern CFA sensors.

The cube may be built using four, essentially identically dimensioned transparent polyhedrons. In one embodiment, each of the polyhedrons has a right isosceles triangular base, a right isosceles triangular top, and three faces joining corresponding sides of the triangular base and top. The three faces are a hypotenuse face, a left leg face, and a right leg face. The hypotenuse face of the first polyhedron is the entrance face of the light splitter cube. The right leg face of the first polyhedron adjoins the left leg face of the second polyhedron at a first dichroic interface. The first dichroic interface reflects the third color component in the first polyhedron, and transmits the first and second color components into the second polyhedron. The left leg face of the first polyhedron adjoins the right leg face of the fourth polyhedron at a second dichroic interface. The second interface reflects the first color component in the first polyhedron, and transmits the second and third color components into the fourth polyhedron.

The light splitter cube may be combined with a deflector that is positioned to reflect the incident light from the camera scene, and an optical lens system, such as a zoom lens, an autofocus lens, or a fixed focus lens, that is positioned in the path of the deflected incident light between the deflector and the entrance face of the light splitter cube. The deflector may be oriented to deflect the incident light by about 90 degrees. This arrangement allows a z-height of the combination deflector, optical lens system, light splitter cube and image sensors as a whole to be in the range of 3 mm-9 mm. In addition, the x-length of that combination may be in the range of 18 mm-32 mm. Such an arrangement yields a particularly compact digital camera module that may have not only optical zoom but also relatively high resolution (due to not requiring demosaicing or color interpolation). Furthermore, the arrangement enables a greater x-length, so that the incident angles of the light rays on any anti-reflection coating or infrared filter, used in the zoom lens or other optical lens system between the deflector and the entrance face of the cube, are reduced. This may lead to several benefits, including reduced color shading and reduced stray light, ghosts, and flares.

A folding mirror can be used as the deflector. The folding mirror may be one that can be tilted and tipped (or rolled) by a powered actuator under automatic control, as part of an optical image stabilization (OIS) mechanism. Such an OIS mechanism may be used instead of a conventional one that requires a moveable sensor or a moveable lens.

The color splitting cube architecture may also be used in polarization imaging, advantageously without "throwing away" 50% of the incident light, as would be the case in a conventional polarization imaging technique. Use the color splitting cube may also be advantageous in polarization sum and difference imaging in order to improve contrast and enhance visibility of targets in scattering media and assist in improved detection and feature extraction of targets in scattering media (e.g., imaging through clouds, fog, smog, and rain).

Yet another application of the color splitting cube may be in combined visible and infrared imaging. The cube may be designed so that one of its exit faces produces one or more visible color components of the incident light from the camera scene while suppressing the infrared component, while another one of its exit faces suppresses visible color components but does not suppress the infrared component.

The above summary does not include an exhaustive list of every aspect of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an"

or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
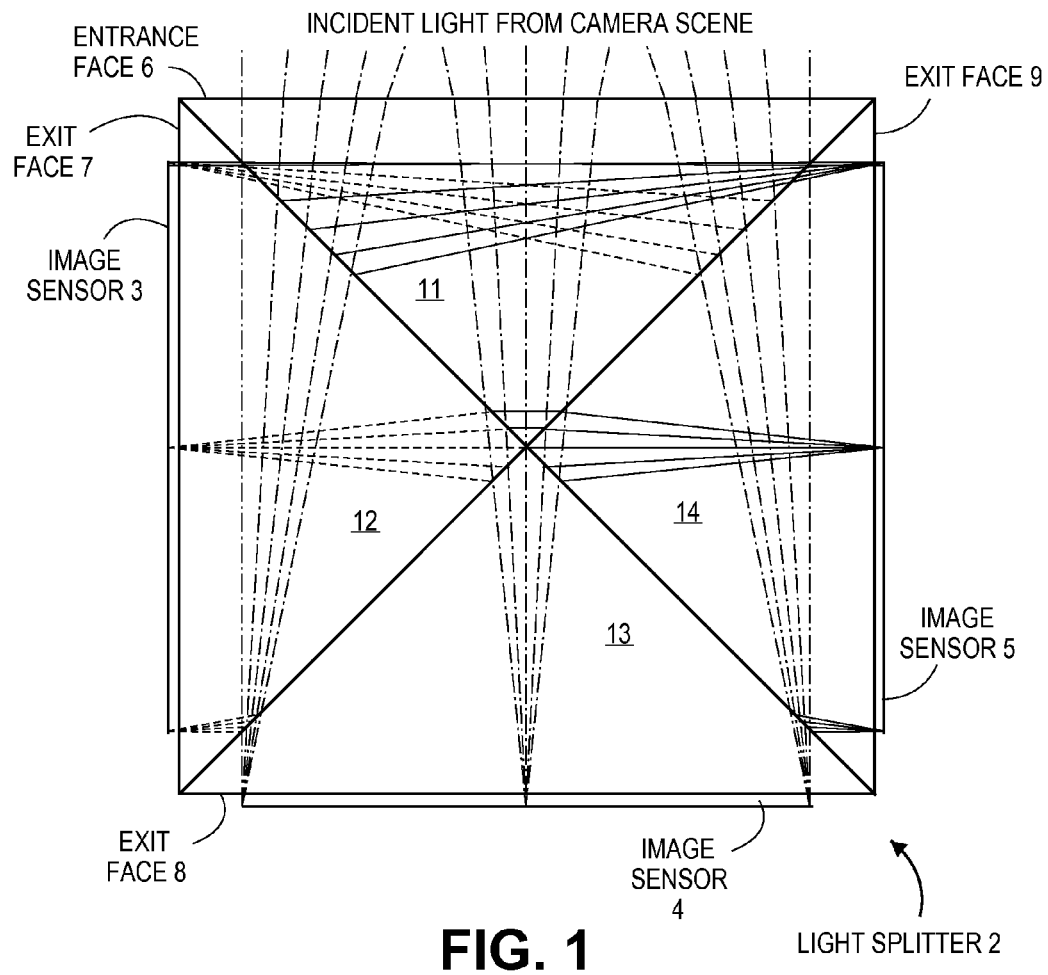
FIG. 1 is a top view through a cross-section of a light splitter, in accordance with an embodiment of the invention.

FIG. 1 is a top view through a cross-section of a light splitter 2, in accordance with an embodiment of the invention. The light splitter 2 may be externally dimensioned and shaped so as to define essentially a cube, as shown. FIG. 1 shows a top view of the cube looking down into the structure, showing how incident light from a camera scene (not shown) is received through an entrance face 6 of the cube. As depicted by three different line shadings, the light splitter 2 acts to split the incident light into first, second and third color components that emerge from the cube through respective exit faces 7, 8, 9. Any reference to "colors" or "color components" here is understood as referring to light within a wavelength band, all of which may be in the visible spectrum, or some of which may overlap with ultraviolet or infrared bands. For instance, a common list of colors identifies six main bands, namely red, orange, yellow, green, blue, and violet.

Figure 2:
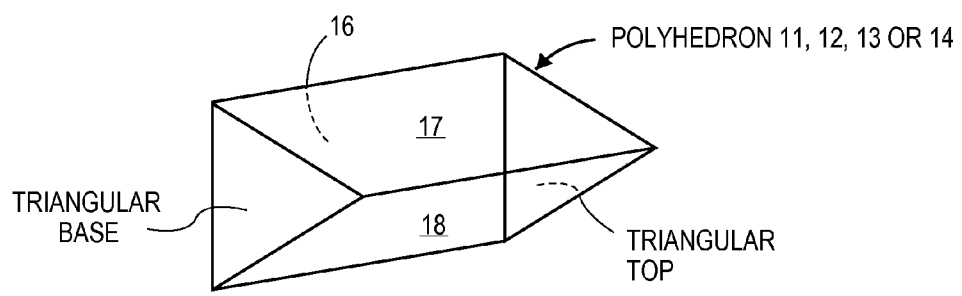
FIG. 2 is a 3-D perspective view of a polyhedron.
Figure 3:
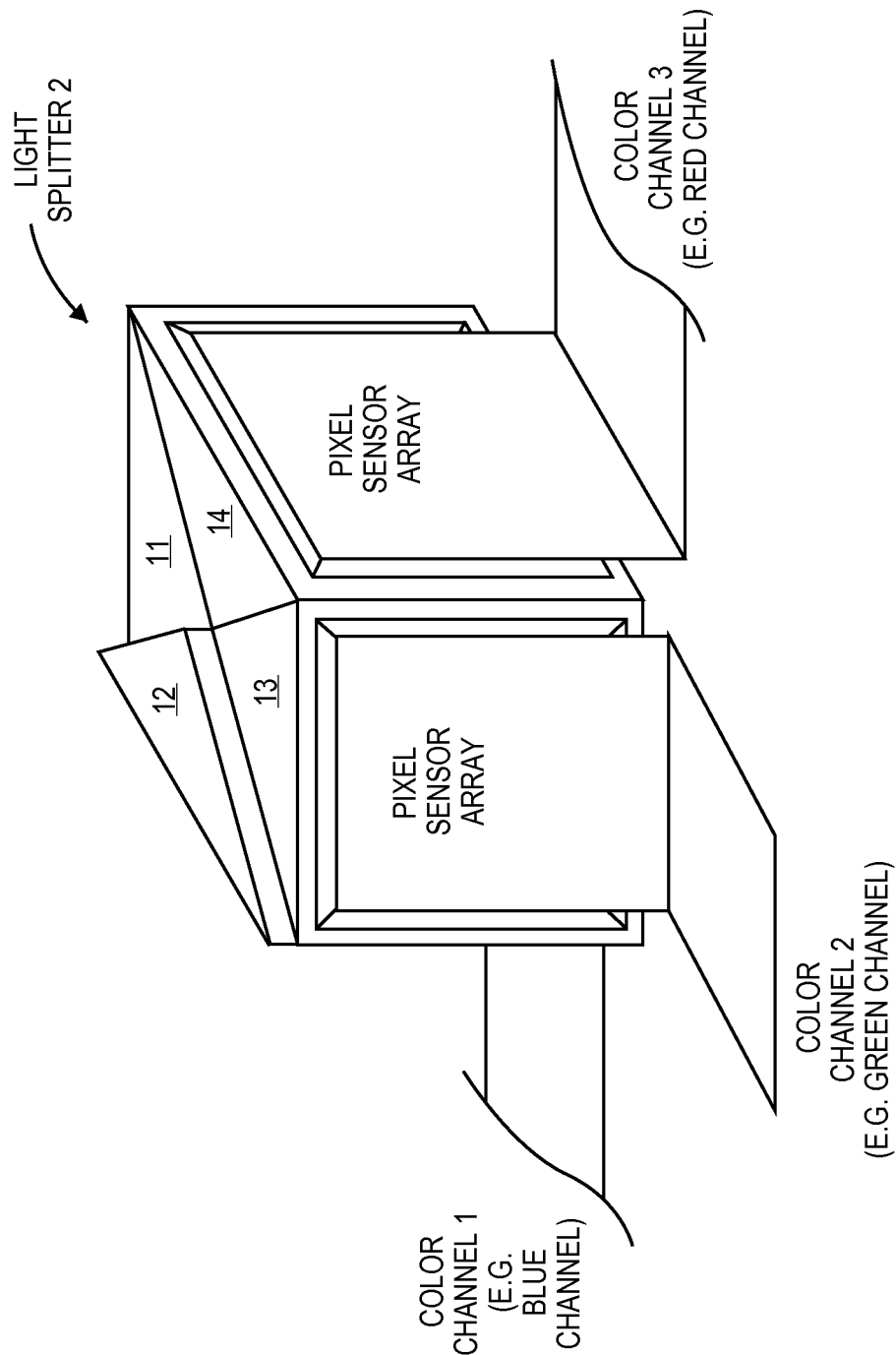
FIG. 3 is a 3-D perspective view of the light splitter.

The light splitter 2 is made essentially of identically sized or dimensioned first, second, third and fourth transparent polyhedrons 11, 12, 13, 14. Each of the polyhedrons may be made of a solid piece of light transparent material such as glass or polycarbonate. As also seen in the 3-D perspective view of FIG. 2, each of the polyhedrons 11-14 has a right isosceles base, a right isosceles top, and three faces joining corresponding sides of the triangular base and top. The three faces of the polyhedron are a hypotenuse face 16, a left leg face 17, and a right leg face 18. These dimensions yield a cube when the polyhedrons have been joined as shown in FIG. 3. As seen in FIG. 1, the hypotenuse face 16 of the first polyhedron 11 is the entrance face 6 of the light splitter 2.

Figure 4:
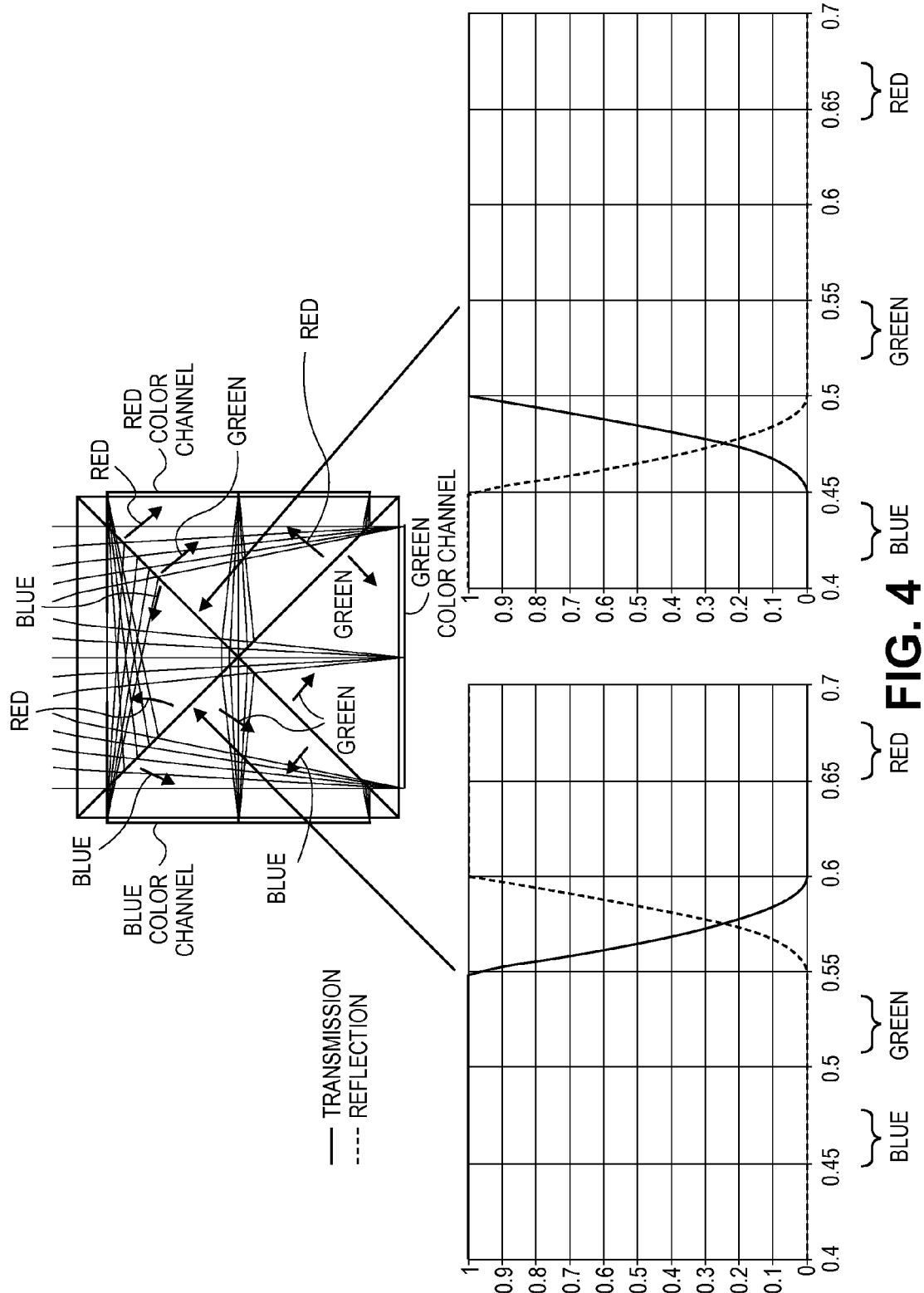
FIG. 4 shows example graphs of transmission and reflection vs. wavelength, describing characteristics of two dichroic interfaces within the light splitter.

The light splitting function of the lighter splitter 2 is achieved as follows. Referring now to FIG. 1 and to the first polyhedron 11, the right leg face of this polyhedron adjoins the left leg face 17 of the second polyhedron 12, at a first dichroic interface. The mixture of light wavelengths arriving at a given sensor can be controlled by appropriately designing the filtering function of the various dichroic interfaces of the light splitter 2. A dichroic interface may be formed by coating the adjoining faces of the first polyhedron 11 and the second polyhedron 12 with an optical coating consisting of one or more layers of optical material. The dichroic interface reflects one color while passing other colors, similar to a dichroic mirror or dichroic reflector, and a dichroic filter. The adjoining faces of the polyhedrons may be optically bonded to each other with no air gap, using an optical coating selected to produce desired light reflection and transmission characteristics. FIG. 4 depicts an example graph of reflection and transmission characteristics vs. wavelength for the first dichroic interface, and one for a second dichroic interface. The second dichroic interface is formed when adjoining the first polyhedron 11 and, in particular, its left leg face 16, with the fourth polyhedron 14 (and, in particular, its right leg face 18).

In the example of FIG. 4, the first dichroic interface is designed to reflect red while passing (transmitting) blue and green. In contrast, the second dichroic interface is designed to reflect blue, and pass green and red. This is achieved by appropriated forming the optical coating at each interface. The graph for the first interface indicates maximum reflection within the red spectrum (at about 0.65 microns), but minimal reflection of green (at about 0.525 microns) and blue (at about 0.475 microns). The transmission characteristics of the first dichroic interface are such that there is full transmission of green and blue, but minimal transmission of red. It should be noted that the reflection and transmission characteristics shown in the graphs of FIG. 4 are ideal, rather than practical. Thus, in practice, the degree of reflection of a color component at a given interface may not be the same as at another interface.

Regarding the second dichroic interface, the optical coating there has been selected so as to result in full transmission of red and green (or wavelengths above 0.5 microns) while at the same time minimal transmission of blue (below 0.475 microns). In addition, the reflection characteristics are such that blue is fully reflected, while red and green (or wavelengths above 0.5 microns) are minimally reflected. This combination reflection and transmission of the first and second dichroic interfaces results in essentially only the red component (see FIG. 1, solid rays) emerging from the hypotenuse face 16 of the fourth polyhedron 14, and, at the same time, essentially only the blue component (see FIG. 1, dashed—rays) emerging from the hypotenuse face 16 of the second polyhedron 12. This allows the pixel sensor array that is part of the image sensor 3 to produce the image data for the blue channel, while the pixel sensor array of the third image sensor 5 produces the red channel.

To obtain the needed green channel (thereby completing the additive primary color model of red, green and blue) the dichroic interfaces between polyhedrons 12 and 13, and polyhedrons 14 and 13, have been designed to, referring now to FIG. 4, pass only the green color component into the polyhedron 13. Accordingly, the pixel sensor array of the image sensor 4 will produce the green color channel. In this manner, no demosaicing of color pixel data is needed, and also there is no need for separate color channel processing at the pixel level. This enables the use of relatively low cost, clear pixel sensor arrays for each of the different color channels, while being able to maximize the pixel sensor array resolution.

The dichroic interfaces may alternatively be designed to achieve a desired mix of any two or more colors passing to a cube exit face (and then to the respective sensor). This may be a desired mix of two primary colors, as desired for the designed system performance. A mix of two or more colors could be achieved by varying the percentage of optical energy transmitted by an interface, at different wavelengths of light. It may thus be desirable to transition the reflection and transmission characteristics smoothly through the optical wavelengths of light, at a given dichroic interface. For instance, it may be desirable to add some portion of the red component of light from the scene to emerge from the exit face that is otherwise associated with the green sensor (green color channel), while some green may be added to emerge from the exit face that is otherwise associated with the red sensor (red color channel). A purpose of such an approach would be to provide more color information to each sensor so that in the subsequent digital image processing operations of color reproduction, more accurate and continuous color detection and image representation could be achieved.

Figure 5:
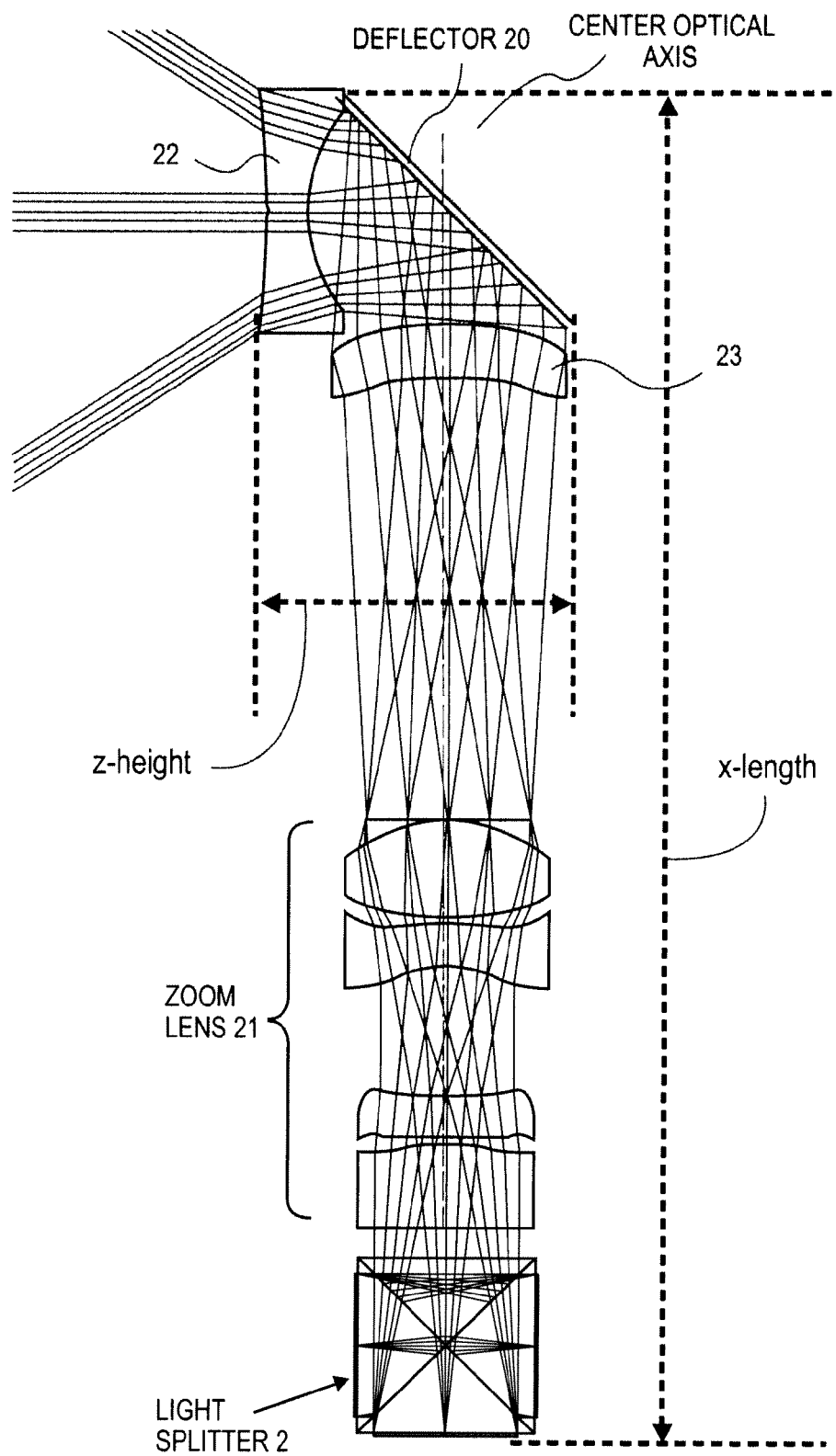
FIG. 5 shows the combination of a light splitter, zoom lens and deflector within a camera module.
Figure 8:
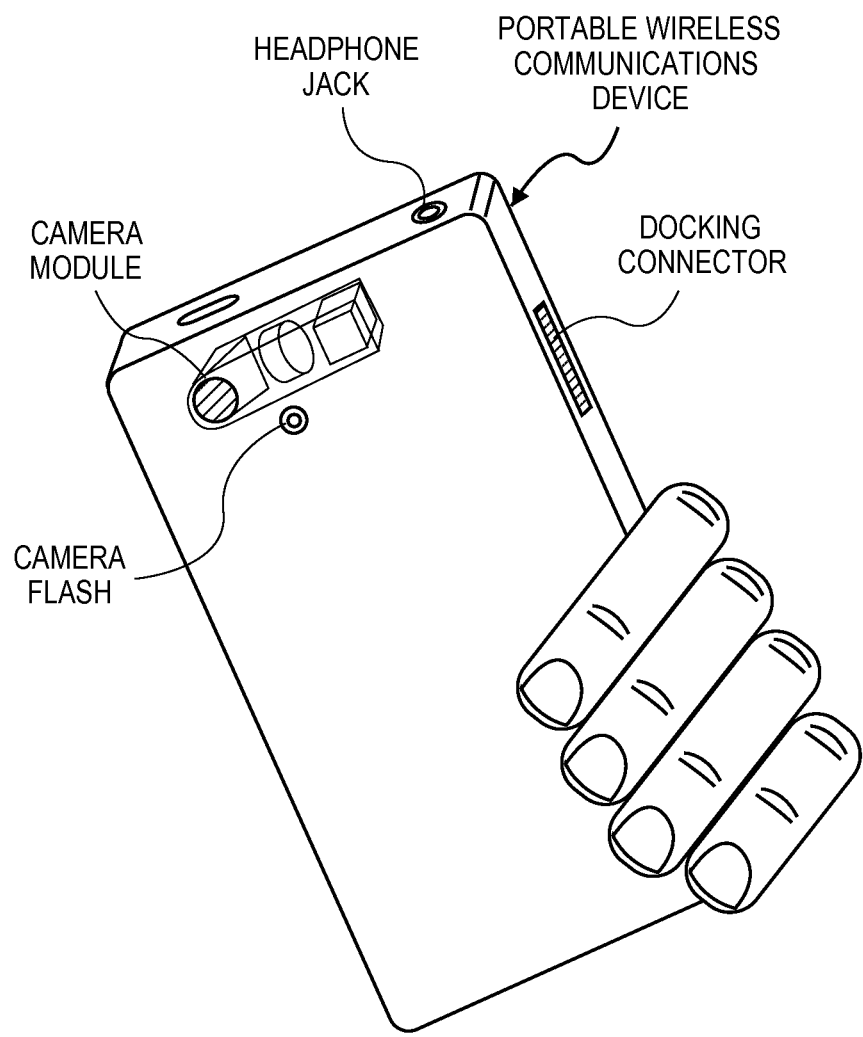
FIG. 8 is a 3-D perspective view of a portable wireless communications device in which a camera module is integrated.

Turning now to FIG. 5, a combination of the light splitter 2, a zoom lens 21, and a deflector 20 within a camera module housing is shown. The camera module housing (not shown) may be a plastic, or metal, or composite material frame in which the elements depicted in FIG. 5 are installed in the relative positions and alignment shown, so as to form a single unit or assembly. The assembly has a z-height defined as shown, and an x-length defined as shown. The deflector 20 is positioned to deflect incident light of several colors (e.g., red, blue and green) from the camera scene towards the light splitter 2. The deflector 20 may be an angled mirror or other optical element that can perform a similar function. The entrance face of the light splitter 2 is oriented perpendicular to the center longitudinal optical axis as shown, to receive the deflected incident light, through the zoom lens 21. In another embodiment the deflector may not be needed such that the optical path may be straight; in that case, light from the camera scene could enter the camera module from the edge or side of the end-user device (rather than from its face as shown in the example of FIG. 8). The zoom lens 21 has one or more moveable lens elements whose position along the optical axis can be automatically controlled by a motorized actuator (not shown) to achieve variable magnification (and thus variable angle of view or field of view, FOV). The zooms lens may be a true zoom lens that can also maintain focus when its magnification or focal length is changed. These are also referred to as parfocal lenses. Alternatively, the zoom lens may be a varifocal lens, which has one or more moveable lens elements that achieve variable magnification, but for which an additional mechanism is needed to bring the image back into focus after a change in magnification.

Still referring to FIG. 5, this embodiment of the camera module also contains a plano-concave lens 22 whose planar side faces the camera scene as shown, and is positioned to bring the light from the camera scene to the deflector 20 as shown. In addition, a convex-concave lens 23 is positioned between the deflector 20 and the zoom lens 21, where the convex side of the lens 23 faces the deflector 20, as shown. Other suitable lens elements, as alternatives to the plano-concave lens 22 and the convex-concave lens 23, are possible. These may be designed as part of the overall optical subsystem of the camera module, in conjunction with the zoom lens 21, and the allowed z-height and x-length.

Figure 6:
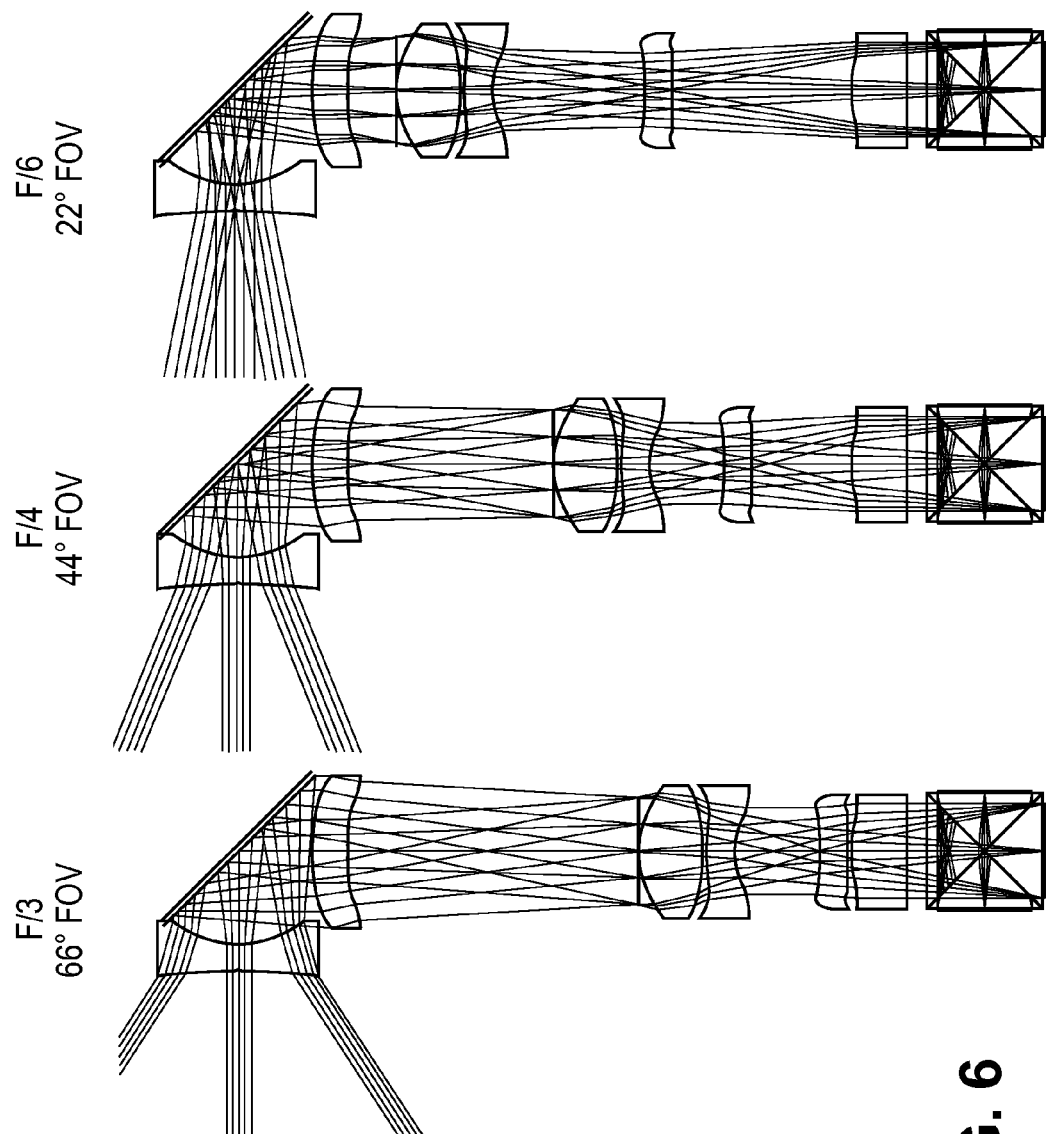
FIG. 6 depicts operation of a zoom lens that has been combined with the light splitter.

FIG. 6 depicts operation of the zoom lens 21 using ray tracing, at three different angles of view that can be achieved. Note how, in this case, the deflector 20 is oriented so as to deflect the incident light from the camera scene by about 90 degrees, towards the zoom lens along the center optical axis. This arrangement of the camera module allows the previously defined z-height of the entire combination (see FIG. 5) to be in the range of 3 mm-9 mm. Simulation of such an optical system has shown that, where the light splitter 2 is a cube of 3.5 mm×3.5 mm×3.5 mm, the x-length of the combination (as defined in FIG. 5) may be in the range 18 mm-32 mm, while at the same time being able to achieve 22°-66° angle of view. This is a particularly compact arrangement that is suitable for being integrated within portable wireless communications devices such as tablet computers and smart phones (e.g., see FIG. 8 for an example smart phone) in which the outer housing of the communications device has a z-height or thickness within the range of 6 mm-13 mm. Of course, the camera module depicted in FIG. 5 may also be fitted into larger products such as laptop computers and desktop computers.

Figure 7:
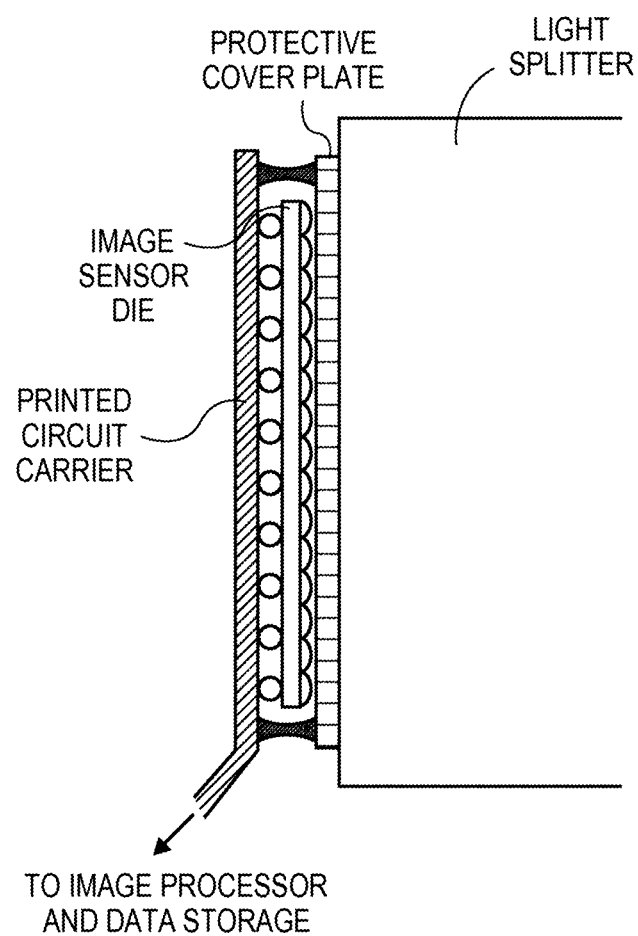
FIG. 7 is an elevation view through a cross-section of a light splitter and image sensor combination.

Turning now to FIG. 7, an elevation view through a cross-section of an exit face of the light splitter 2 is shown. This depicts an example of how the image sensor may be attached to the exit face. The image sensor includes an image sensor die in which an array of photocells are covered with micro lenses, without requiring any color filters or color separation circuitry. The micro lenses are preferred in order to minimize optical cross-talk, however it is feasible to achieve acceptable performance without the micro lenses. The image sensor die is electrically connected to a printed circuit carrier, in this example a flex circuit that is located behind the sensor as shown, via solder balls. Other ways of electrically connecting to the circuit carrier are possible, e.g. wire bonds. The sensor is protected by a transparent cover plate, e.g. a glass or polycarbonate plate; the plate is located in front of the sensor so as to leave an air gap between the cover plate and the micro lenses. It is preferred that this transparent cover plate be bonded to the sensor die for optimal planarity, however it maybe possible with appropriate methods to achieve the required planarity by bonding the glass to the printed circuit carrier. The circuit carrier carries electrical image signals from the sensor die to image data storage and/or an image processor (not shown). Note that the combination of the printed circuit carrier and the attached protective cover plate, as a single unit or assembly, may be manufactured separately from the light splitter 2, and then the exposed face of the protective cover plate may be optically bonded to the exit face of the light splitter 2.

The cover plate over the sensor die could be bonded to the light splitter cube to create a sensor-cube sub-assembly. Maintaining planarity for the cover plate to the sensor plane is an important for the sensor assembly. One way to bond a sensor assembly to the cube is by a UV curable optical adhesive, which would be applied to the exposed face of the cover plate. The cover plate or the cube can be moved relative to each other, and be brought together and pressure applied to them in order to create a thin adhesive bondline between the two parts. Once in contact with each other, the relative position of the sensor and the cube can be adjusted by sliding one part relative to the other part, to achieve the required alignment. The alignment can be determined by simultaneously reading out the sensor signals while providing a target optical image input (in the camera scene) to the cube for this alignment purpose. While manipulating the parts, the correct alignment may be achieved as revealed by processing the read sensor signals; at that point, the manipulation stops and the parts are locked in place by the application of UV light, which will cross-link and cure the UV adhesive.

Referring now to FIG. 8, a 3-D perspective view of a portable wireless communications device in which a camera module in accordance with an embodiment of the invention is integrated. The device in this case may be a smart phone or a tablet computer, which is a handheld device in the sense of being intended for use while held in a single hand of the user. Of course, the camera module may alternatively be integrated in other types of portable wireless devices, such as laptop or notebook computers, and it may also be integrated within non-portable devices such as desktop personal computers, television monitors, or any other electronic device that has a particularly short profile in the z-axis (z-height). In the case of the smart phone or tablet computer, the device has an outer housing in which is integrated a cellular network wireless communications circuit that enables the device to function as a mobile telephony terminal or end station. Also integrated inside the housing as depicted in FIG. 8 is a digital camera, part of which is the camera module depicted in FIG. 5 and described above in detail. As suggested above, the portable wireless communications device may have an outer housing whose z-height is in the range of 6 mm-13 mm, thereby being particularly fitting to receive therein a camera module that has a z-height within the range of 3 mm-9 mm.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although the figures show a light splitter that yields the primary additive colors of red, green and blue, the light splitter may alternatively be designed to split the incident light into a different set of color components (e.g., cyan, yellow, green, magenta, CYGM, and red, green, blue, emerald, RGBE). Also, while FIG. 5 depicts an embodiment of the invention where the optical lens system is a zoom lens 21, the camera module containing the light splitter cube may alternatively have a different optical lens system such as a smaller Auto Focus lens or even a smaller fixed focus lens. The description is thus to be regarded as illustrative instead of limiting.

What is claimed is:

1. A digital camera device comprising a device housing in which the following are integrated:
    a light splitter having an entrance face to receive incident light from a camera scene, the incident light from the camera scene entering the housing through a face of the housing, a depth from the face of the device housing to an opposite side of the housing being shorter than length and width of the face of the device housing,
    the light splitter to split the incident light into a plurality of color components of first color content, second color content, and third color content, respectively, that emerge from the light splitter through a first exit face, a second exit face, and a third exit face of the light splitter, respectively, wherein the light splitter comprises first, second, third and fourth transparent polyhedrons, wherein the first transparent polyhedron adjoins the second transparent polyhedron at a first dichroic interface and the first transparent polyhedron adjoins the fourth transparent polyhedron at a second dichroic interface, and wherein some of the first color content or third color content in the incident light emerges from the second exit face in addition to the color component of the second color content;
    first, second and third image sensors, each being positioned to receive a respective one of the color components that emerge from the first, second and third exit faces of the light splitter;
    a deflector positioned to deflect the incident light from the camera scene towards the light splitter; and
    a zoom lens system positioned entirely in a path of the deflected incident light between the deflector and the entrance face of the light splitter, wherein the zoom lens system comprises more than two moveable lens elements
    wherein each of the image sensors is a) a clear image sensor having an array of photocells covered with micro lenses but no color filters, b) electrically connected to a printed circuit carrier located behind the sensor, and c) protected by a transparent cover plate that is located in front of the sensor and that leaves an air a between the cover plate and the micro lenses, wherein the transparent cover plate is bonded to one of the first, second, or third exit faces of the light splitter.

2. The digital camera device of claim 1, wherein each of the transparent polyhedrons comprises a hypotenuse face, a left leg face, and a right leg face.

3. The digital camera device of claim 2, wherein the hypotenuse face of the first polyhedron is the entrance face of the light splitter,
    the right leg face of the first polyhedron adjoins the left leg face of the second polyhedron at the first dichroic interface, and
    the left leg face of the first polyhedron adjoins the right leg face of the fourth polyhedron at the second dichroic interface.

4. The digital camera device of claim 1, wherein the deflector is oriented to deflect the incident light by about ninety degrees.

5. The digital camera device of claim 1, wherein a z-height of the deflector, zoom lens system, light splitter and image sensors is in the range 3 mm-9 mm.

6. The digital camera device of claim 5, wherein x-length of the deflector, zoom lens system, light splitter and image sensors is in the range 18 mm-32 mm.

7. The digital camera device of claim 1, wherein the zoom lens system is an auto focus lens.

8. The digital camera device of claim 1, wherein the deflector comprises a folding mirror that is coupled to be tilted or rolled by a powered actuator under automatic control, as part of an optical image stabilization (OIS) mechanism.

9. The digital camera device of claim 1 further comprising:
    a plano-concave lens whose planar side faces the camera scene and is positioned to bring the light from the camera scene to the deflector; and
    a convex-concave lens whose convex side faces the deflector and is positioned between the deflector and the zoom lens system.

10. A portable wireless communications device comprising:
    an outer housing;
    wireless communications circuitry integrated inside the outer housing; and
    a digital camera integrated inside the housing, the digital camera having a deflector positioned to deflect light from a camera scene by about ninety degrees, a light splitter having an entrance face to receive the deflected light, the light splitter to split the deflected light into a plurality of color components of first, second and third color content, respectively that emerge through a first exit face, a second exit face, and a third exit face, respectively, and first, second and third image sensors, each being positioned to face the first, second and third exit faces, and a zoom lens system positioned entirely in a path of the deflected light between the deflector and the entrance face of the light splitter, wherein the zoom lens system comprises more than two moveable lens elements, wherein the light splitter comprises first, second, third and fourth transparent polyhedrons, wherein the first transparent polyhedron adjoins the second transparent polyhedron at a first dichroic interface and the first transparent polyhedron adjoins the fourth transparent polyhedron at a second dichroic interface, wherein the first dichroic interface reflects light of the third color content and passes light of the first color content and of the second color content, wherein the second dichroic interface reflects light of the first color content and passes light of the second color content and of the third color content, and wherein some of the first color content or the third color content in the deflected light emerges from the second exit face in addition to the color component of the second color content, wherein each of the image sensors is a) a clear image sensor having an array of photocells covered with micro lenses but no color filters, b) electrically connected to a printed circuit carrier located behind the sensor, and c) protected by a transparent cover plate that is located in front of the sensor and that leaves an air gap between the cover plate and the micro lenses, wherein the transparent cover plate is bonded to one of the first, second, or third exit faces of the light splitter.

11. The portable wireless communications device of claim 10 wherein the outer housing has a z-height of 6 mm-13 mm.

12. The portable wireless communications device of claim 10 further comprising:
a plano-concave lens whose planar side faces the camera scene and is positioned to bring the light from the camera scene to the deflector; and
a convex-concave lens whose convex side faces the deflector and is positioned between the deflector and the zoom lens system.

13. The portable wireless communications device of claim 10, wherein the zoom lens system is an auto focus lens.

14. The portable wireless communications device of claim 10, wherein the deflector comprises a folding mirror that is coupled to be tilted or rolled by a powered actuator under automatic control, as part of an optical image stabilization (OIS) mechanism.

15. The portable wireless communications device of claim 10, wherein x-length of the deflector, zoom lens system, light splitter and image sensors is in the range 18 mm-32 mm.

16. The portable wireless communications device of claim 10 further comprising:
a plano-concave lens whose planar side faces the camera scene and is positioned to bring the light from the camera scene to the deflector; and
a convex-concave lens whose convex side faces the deflector and is positioned between the deflector and the zoom lens system.

17. The portable wireless communications device of claim 10, wherein each of the transparent polyhedrons comprises a hypotenuse face, a left leg face, and a right leg face.

18. The portable wireless communications device of claim 17, wherein the hypotenuse face of the first polyhedron is the entrance face of the light splitter,
the right leg face of the first polyhedron adjoins the left leg face of the second polyhedron at the first dichroic interface, and
the left leg face of the first polyhedron adjoins the right leg face of the fourth polyhedron at the second dichroic interface.

19. The portable wireless communications device of claim 10, wherein the deflector is oriented to deflect the incident light by about ninety degrees.

* * * * *